United States Patent
Zoeteman et al.

(10) Patent No.: US 11,580,187 B2
(45) Date of Patent: Feb. 14, 2023

(54) METHOD AND SYSTEM FOR LOCALIZED CONTENT DISTRIBUTION FOR INTERNET MEDIA

(71) Applicant: StatePoint Media Inc., New York, NY (US)

(72) Inventors: Tony Zoeteman, Madison, WI (US); Robert Silverman, New York, NY (US)

(73) Assignee: Statepoint Media, Inc., New York, NY (US)

( * ) Notice: Subject to any disclaimer, the term of this patent is extended or adjusted under 35 U.S.C. 154(b) by 0 days.

(21) Appl. No.: 17/188,642

(22) Filed: Mar. 1, 2021

(65) Prior Publication Data

US 2022/0188375 A1  Jun. 16, 2022

Related U.S. Application Data

(60) Provisional application No. 63/126,444, filed on Dec. 16, 2020, provisional application No. 63/124,199, filed on Dec. 11, 2020.

(51) Int. Cl.

| | |
|---|---|
| *G06F 40/00* | (2020.01) |
| *G06F 16/957* | (2019.01) |
| *G06F 16/955* | (2019.01) |
| *G06F 16/9537* | (2019.01) |
| *H04L 67/02* | (2022.01) |
| *G06F 40/106* | (2020.01) |
| *G06F 40/143* | (2020.01) |
| *G06F 3/0482* | (2013.01) |

(52) U.S. Cl.
CPC ........ *G06F 16/9577* (2019.01); *G06F 3/0482* (2013.01); *G06F 16/955* (2019.01); *G06F 16/9537* (2019.01); *G06F 40/106* (2020.01); *G06F 40/143* (2020.01); *H04L 67/02* (2013.01)

(58) Field of Classification Search
CPC .............. G06F 16/9577; G06F 16/955; G06F 16/9537; G06F 40/106; G06F 40/143
See application file for complete search history.

(56) References Cited

U.S. PATENT DOCUMENTS

| | | | | |
|---|---|---|---|---|
| 8,510,413 B1 * | 8/2013 | Hoffman | ................ | H04L 67/42 463/25 |
| 8,898,162 B2 * | 11/2014 | Ganis | .................. | G06F 16/9537 707/723 |
| 10,140,125 B1 * | 11/2018 | Bhasin | ...................... | G06F 8/70 |
| 10,380,218 B2 * | 8/2019 | Dodeja | ................ | G06F 40/117 |
| 2008/0033652 A1 * | 2/2008 | Hensley | ................ | G06Q 10/08 702/5 |
| 2010/0198684 A1 * | 8/2010 | Eraker | ................... | G06Q 30/02 707/769 |
| 2013/0110631 A1 * | 5/2013 | Mitchell | ................ | G06Q 10/00 705/14.58 |

(Continued)

*Primary Examiner* — Scott T Baderman
*Assistant Examiner* — Barbara M Level
(74) *Attorney, Agent, or Firm* — Ted Sabety; Sabety +associates, PLLC

(57) ABSTRACT

The claimed invention delivers location specific content to a webpage based on a location tag data comprising the webpage that constitutes the website's declaration of a geographic location to the content server, such that the content all appear in the same space on the page, without the need for the page to refresh, allowing a user to play multiple games and to read multiple stories in a single session.

15 Claims, 3 Drawing Sheets

(56) References Cited

U.S. PATENT DOCUMENTS

| | | | | |
|---|---|---|---|---|
| 2014/0327655 A1* | 11/2014 | Avrahami | ............... | G06F 3/017 |
| | | | | 345/175 |
| 2015/0112774 A1* | 4/2015 | Georgoff | ............ | G06Q 30/0273 |
| | | | | 705/14.1 |
| 2015/0186532 A1* | 7/2015 | Agarwal | ............... | G06F 16/951 |
| | | | | 707/736 |
| 2015/0324336 A1* | 11/2015 | Glezos | .................... | G06F 40/58 |
| | | | | 715/234 |
| 2015/0371269 A1* | 12/2015 | Seth | .................. | G06Q 30/0261 |
| | | | | 705/14.58 |
| 2016/0171101 A1* | 6/2016 | Wouhaybi | ........... | G06F 16/9537 |
| | | | | 707/710 |

* cited by examiner

METHOD AND SYSTEM FOR LOCALIZED CONTENT DISTRIBUTION FOR INTERNET MEDIA

PRIORITY CLAIM

This is a utility patent application which claims the benefit of U.S. Provisional Patent Application No. 63/126,444 filed on Dec. 16, 2020 and U.S. Provisional Patent Application No. 63/124,199 filed on Dec. 11, 2020, both of which are hereby incorporated by reference in their entireties for all that they teach herein.

FIELD OF INVENTION

This invention provides top content relating to software code providing a media website or other web-delivered property that is customized with location specific content. This can include trivia games, crossword puzzles, feature stories and photographs that are relevant to a particular location that is associated with the website. The content is automatically selected to be localized and provides localized features for readers, as well as high value CPM banner and video ad opportunities that target localized audiences.

BACKGROUND

Media websites often provide nationwide news and stories. While local websites provide information on state or town specific news, these websites vary and are often in need of additional localized content. The claimed invention provides a website's users or readers with localized content that may include puzzles and games, and feature stories based on locality data which is determined by the website's declared location. In a preferred embodiment, the components of the selected localized content is all appear in the same predetermined space on the page, without the need for the webpage page to refresh. This technique permits the user to operate and interact with the content in a single session. In addition, this technique enables the media website's publishers to showcase multiple localized advertising opportunities on rotation. The content may be promoted in social media, print, and other channels to drive site traffic and build databases or paid subscriptions and sell HTML email ads from user registrations.

SUMMARY

The claimed invention is comprised of a localization HTML code (or other form of markup language comprised of a script, whether compiled or interpreted) which is transmitted from a content delivery server to a user's computer that is displaying a webpage delivered from a web server. The code delivered from the content server may include three pieces of data: a first interactive element, which may include a trivia game in the shape of one of the states in the United States and in form of a crossword puzzle; a second interactive element, which may include a list of additional games or other interactive content; and a third interactive element, which may include a list of automatically selected localized feature stories and photographs. The second and third interactive elements are configured to receive a selection from a user in order that the selected content be downloaded. The automatic selection of localized content is automatically determined by detection of a localization flag value that is encoded into the webpage called down from the web-server to the user's actual location.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. For example, where the description refers to a "browser" program, the invention may equally apply to an "app" that also receives content from a remote server for display to the user. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
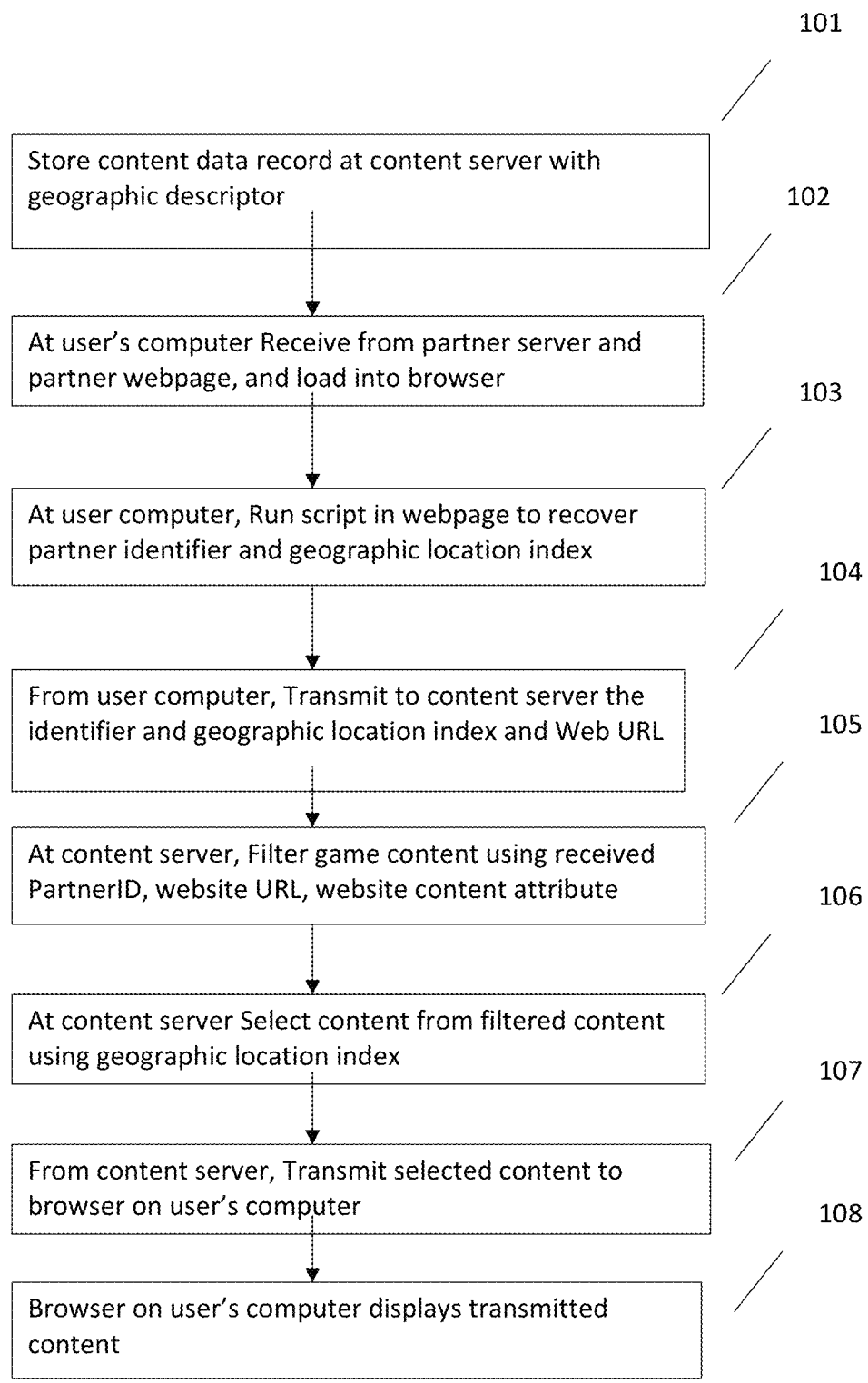
FIG. 1 Exemplary flowchart depicting the basic overview of the claimed invention FIG. 2 Exemplary flowchart depicting the basic computer architecture FIG. 3 Exemplary selected content based on localization flags presented on a browser.
Figure 2:
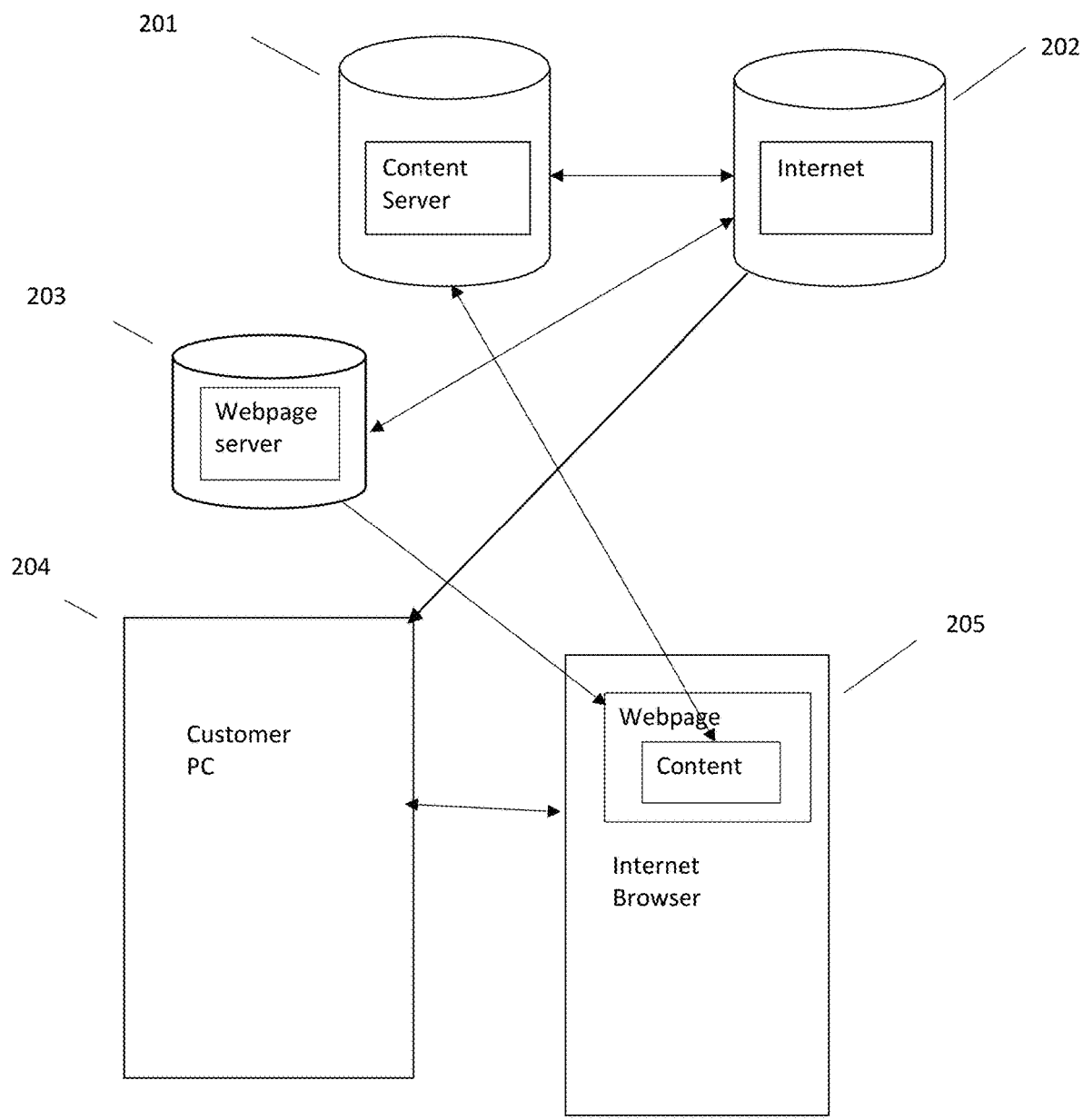
Figure 3:
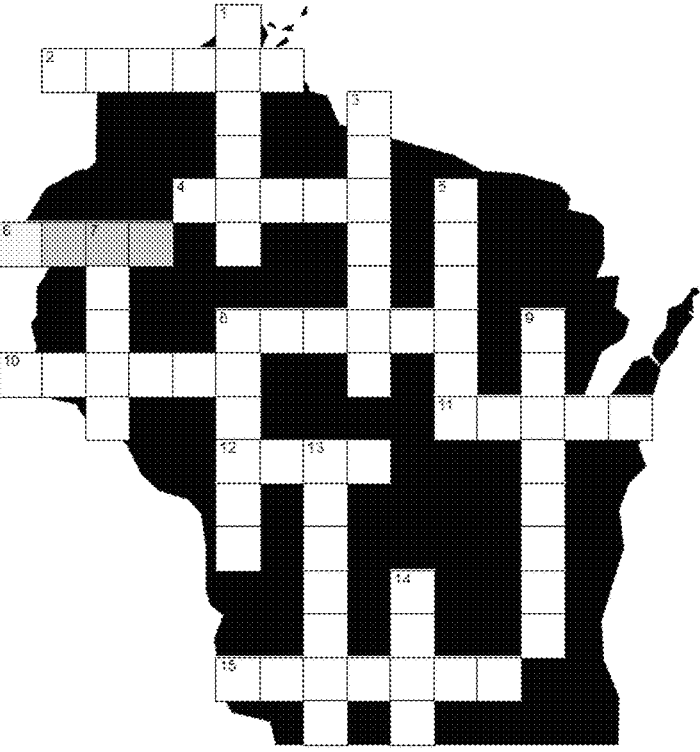

The selection of the first interactive element, which may be game payload, requires that the content servers (201, 202) determine the designated location for the browser (101) that is displaying the webpage delivered from the web-server. This is accomplished when the webserver delivers the webpage to the user. The webpage is comprised of the location flag. The webpage is further comprised of a script that transmits the location flag to the content server as part of the protocol to request the localized content. The content server uses the received location flag to determine and select the corresponding game payload (102) for transmission back to the user's computer (204) operating the browser (205) that is displaying the webpage. FIG. 1, FIG. 2. The code running on the displayed webpage executes a protocol with the content servers servers comprised of databases to dynamically serve up localized content, which may be localized games and localized feature stories per the received location flag. The trivia games blend popularity of crosswords and trivia with state pride, which appeals to a broader audience than crossword users alone. FIG. 3. These puzzles include interactive timers, reveal letters, reveal words, and more information. FIG. 3. One new game is released at various intervals, for example each week, day, monthly, etc. with a library of additional games included in the "more" section at launch. Users will be able to login to play more games, as well as track their best times and scores, which will allow for gamification.

The invention is comprised of a multi-step protocol:

First, the localization HTML code comprising the webpage contains a unique identifier data value which tracks the partner company that owns and operates the website that delivers the webpage to the user's computer (103). This identifier, referred to as the PartnerID, can be used on an indefinite number of partner websites published by the same partner. In addition the localization HTML code is further comprised of a second, discrete location flag identifier in the form of an alphanumeric string or numeric data value that corresponds to the geographic location that is to be associated with the webpage. This correspondence may be by town, county, state or country. In one embodiment the location flag is an alphanumeric string of two characters comprising a United States state abbreviation.

Second, the localization HTML code executes within the browser, to read and transmit the PartnerID, location flag and the URL of the webpage to the content servers (104).

Third, in one embodiment, the content servers receive the three items and perform to do the following: (a) perform a logic check to determine the validity of the partner status; (b) perform a logic check to select appropriate content from the curated content on the content server to the user's client Internet browser (107, 108); and (c) validate content based on valid date ranges as each piece of content (game, story, etc.) is timely and therefore is designated to go live on a certain run date and be removed on a removal date. The selection filter uses this information (105) and determine which content to load on the media site page for each user (106), depending on the location flag data that the content server has received.

In one embodiment, each media customer (also referred to as a "partner"), who operates a website delivers a payload to the viewer's browser displaying the webpage of the website. Each media customer gets a custom script that is comprised of an identifier index corresponding to the media customer. The customer places that script in their webpage that is served from the partner's server. This means that the identifier is stored on the customer's server that hosts the webpage so that it is delivered to every browser displaying the webpage. The identifier is unique to the media customer. This facilitates the functionality that the customer can use the same script on multiple webpage/websites that they have. Each customer specifies what geographic location to use for a specific website, downloadable app or other on-line content that they operate. In one embodiment, this is referred to as the "state operator variable" and is also stored as part of the webpage so that it is installed by the media customer on the relevant webpage, so that the script running on the viewer's browser also transmits that partner SOV to the system server.

The content payload, which may include a puzzle or game, is selected at the system server using the received SOV and the partner identifier. A database of games, puzzles or content is stored in a relational database as a set of records. Each record has a corresponding attribute of one or more SOV values that the specific game/puzzle is available for. Other attributes can include the type of content the game or puzzle is relevant for. An exemplary data table stored in the database is presented:

| Index | Partner | Game Name | List of Localities | Content Type | Pointer to Content File |
|---|---|---|---|---|---|
| 102894 | 1425// Milwaukee Times | Wisconsin Trivia Crossword | WI, MN | Game | 1244589-> |
| 19573 | 1537//Star Ledger | Jersey Shore Beach Trivia | NJ | Game | 15336-> |

On the server, the system maps the partner media customer and SOV pair of values to a list of available puzzles for that pair. In one embodiment a data structure or data table stores for each partnerID, one or more Web URLs and their associated localities

| Index | Partner | Web URL | List of Localities | Age Rating |
|---|---|---|---|---|
| 15338 | 1425// Gannett | www.milwaukeetimes.com | WI | All |
| 15338 | 1425// Gannet | www.fargosentinal.com | ND | All |

There can also be a data record that associates the partners with a list of appropriate possible puzzles/games. Some would be content selected, or other contexts. For example the data record may have as attributes flags indicating which type of content the website has, and what kinds of games or puzzles are appropriate. Such content attributes may indicate whether a website has content for children or content for adults. Or it may indicate a type of content distinction, like Entertainment/Gossip vs. Business news. In addition, the website can indicate a geographic relevance, for example, a country, state or city.

One of the available localized content, for example a puzzle of local interest is selected by the content server system for immediate display on the webpage that made the request. The immediate selected content may include another script/data combination gets delivered to the user's browser for rendering. The selection may be made in a number of ways including, the most recent content, or a data object representing a list of selectable content is delivered to the browser for display. Once displayed on the browser or the app, a selection event is detected at the browser and an index transmitted from the browser/app up to the server. The server then selects the puzzle, game or content data associated with the index in the list. This data is transmitted back to the browser or app so that the browser/app can render the selected puzzle or game in the displayed webpage.

In this way, the content server (201), having received the Partner identifier, location flag and webpage URL from the browser (202, 203) can then automatically filter which games, puzzles or other content can be used for that displayed webpage. This is accomplished by running a matching algorithm that selects the content using Boolean logic dependent on determining whether or not the attributes corresponding to the webpage preclude content attributes in the content database. In addition, the identifier and URL may be used in order to filter types of advertising content to be delivered with the puzzle and game data.

Brands in the form of text data or logo imagery can be inserted into the content stream transmitting the content to the browser in various ways. The system server may insert brands and advertising into the data payload before it is transmitted to the browser. The branding or advertising can be selected based on the partner identifier as well as the geographic relevance data that is obtained from the data record corresponding to the website. For example, there may be a data table that correlates pointers to advertising content with relevant location flag values. A matching algorithm may perform Boolean logic to determine for a website's location flag, which advertising content is appropriate. By counter example, an advertisement for a car dealership in Newark, N.J., would be associated with locality flags NY and NJ. Then, when the content server is displaying a webpage comprised of a locality flag of either "NY" or "NJ", the car dealership advertisement passes the logic filter.

The Partner ID is used for reporting and tracking the selection and usage of the games on the Partner's website. The browser transmits the URL of the webpage to the server (201, 202), with a string representing the domain of the website. As described, the system can then select a game or puzzle or other content that is transmitted back to the browser in response, for the browser to display (204, 205). When that occurs, the system can store in a data structure for each partner, which webpage resulted in a request for which game/puzzle. In this way, data records can record for each game or puzzle property, which website made a request for a game, which game was selected and a date/time stamp. In addition, the script operating on the displayed webpage can be used to transmit data to the server including which games are selected, which played, how long the game was played, game completion. In one embodiment, a polling interval set in the browser counts and waits for the event, and when the timing event occurs, a message is then transmitted to the server indicating whether the game is being operated or not. When the event happens, the script logic transmits a message to the server with the Partner ID indicia of identity, website, date and time stamp, which puzzle, game, or other interactive content was being displayed.

In the preferred embodiment, the content that is sent from the servers (201) to the user's client Internet browser (202) is aggregated and is comprised of text as well as visual images for each item—as an example, the content may be comprised of games, feature stories with single images, listicles with multiple images, and infographics, each with text and images in varying layouts. FIG. 3 The content is then transmitted to the client's Internet browser (205), where the user may cycle through and select different games and articles—meaning Applicant's code "Listens" for different content requests until the user leaves the page. Promotional customer stories, and journalistic/AP style articles are labeled as "advertorial." In an embodiment, the payload transmitted to the browser displaying the webpage includes audio-visual data that is displayed for a period of time before the game or puzzle is presented. In another embodiment, the viewer can switch from article to puzzle or game to reading an article without requiring a refresh of the webpage because both the article content and the puzzle data are loaded on demand asynchronously by the script, that is, the script acts in reaction to the event "Click on Article Content."

In another embodiment, the date and time is used for tracking and reporting various events, for example: (i) the user beginning a puzzle; (ii) the user completing a puzzle; (iii) button clicks for feature functionality (e.g., Reveal Word, Solve); (iv) tracking time spent on a game whereby the server sends a regular ping to check that the browser is still open with a specific game displayed; (v) the number of times each game is served on each specific website and how long time is spent on each puzzle on each website. FIG. 3. The code running on the browser tracks time starting once a puzzle is clicked. These processes occur outside of the protocol between the content server system servers and the Partner website server. The content servers aggregate the data and then process the data separate and apart from the code items that are integrated into the web-page file hosted by the partner web server, in order to generate usage reports and other analytics about the content payload. The website generates High-CPM Banner and Video Ads, and the localized trivia game and feature story content attracts registrations and email opt-ins. The users can click on a hyperlink and input information about themselves, such as their name and email address, and provide permissions to receive email newsletters which include information such as subscription offers, news headlines, contests and promotions and local offers. The users are induced to provide opt-in information and create an account because they can do one or more of the following things: keep track of their game scores, access additional content, be notified of new content, and/or compete against other players via gamification opportunities. The localized trivia games provide ideal content to deliver high-value video ads prior to game commencement, due to the demand for the content, and the high value CPM banner ads are intended to be displayed by the media publishers because of the extended time users spend on a page. Upcoming events can be promoted to provide information about complementary content.

In yet another embodiment, the invention includes a code block that gets embedded into the partner webpage that provides varying presentation of the content payload, be it puzzles, games or feature story content based upon the design of the partner website or app layout, e.g. what content to place where on the page based on the browser's display width. Parametric data about the webpage is transmitted to the content server when the webpage first is downloaded and launched. Based on that received parametric data, the content server determines which buttons will be shown or hidden, which content will be displayed or hidden and how the puzzle grids will be sized. The grid size is determined at load and refresh of the webpage and remains constant even if the browser is resized or a mobile device is re-oriented from portrait to landscape orientation; other portions of the layout may be responsive Operating Environment:

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand-held computers, laptop or mobile computer or communications devices such as cell phones, smart phones, and PDA's, multiprocessor systems, microprocessor-based systems, set top boxes and plug-ins, smart televisions, automotive in-vehicle infotainment systems, aerospace in-flight infotainment systems, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it remotely using a network. In one embodiment, the user's computer is omitted, and instead an equivalent computing functionality is provided that works on a server. In this case, a user would log into the server from another computer over a network and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In one embodiment, a user's computer can run an application that causes the user's computer to transmit a stream of one or more data packets across a data network to a second computer, referred to here as a server. The server, in turn, may be connected to one or more mass data storage devices where the database is stored. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In addition, the user's computer may obtain data from the server that is considered a website, that is, a collection of data files that when retrieved by the user's computer and rendered by a program running on the user's computer, displays on the display screen of the user's computer text, images, video and in some cases outputs audio. The access of the website can be by means of a client program running on a local computer that is connected over a computer network accessing a secure or public page on the server using an Internet browser or by means of running a dedicated application that interacts with the server, sometimes referred to as an "app." The data messages may comprise a data file that may be an HTML document (or other hypertext formatted document file), commands sent between the remote computer and the server and a web-browser program or app running on the remote computer that interacts with the data received from the server. The command can be a hyper-link that causes the browser to request a new HTML document from another remote data network address location. The HTML can also have references that result in other code modules being called up and executed, for example, Flash, scripts or other code. The HTML file may also have code embedded in the file that is executed by the client program as an interpreter, in one embodiment, Javascript. As a result a data message can be a data packet transmitted from or received by a computer containing a destination network address, a destination process or application identifier, and data values or program code that can be parsed at the destination computer located at the destination network address by the destination application in order that the relevant data values or program code are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (JO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the JO circuitry or the data communication circuitry. The data stored in memory may be further recalled from the memory device, further processed or modified by the CPU in the manner described herein and restored in the same memory device or a different memory device operatively connected to the CPU including by means of the data network circuitry. In some embodiments, data stored in memory may be stored in the memory device, or an external mass data storage device like a disk drive. In yet other embodiments, the CPU may be running an operating system where storing a data set in memory is performed virtually, such that the data resides partially in a memory device and partially on the mass storage device. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. For example, the CPU may obtain two data values from memory and the logic in the CPU determine whether they are the same or not. Based on such Boolean logic result, the CPU then selects a first or a second location in memory as the location of the next step in the program execution. This type of program control flow may be used to program the CPU to determine data, or select a data from a set of data. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Javascript, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more elements, encoded into computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method executed by a computer system comprised of a first server, a second server and a user's computer operating a browser process in communication with the first server and second server comprising:
    transmitting from the first server to the user computer a webpage data object comprised of data representing a webpage source identifier and a geographic descriptor, said webpage data object further comprised of a script comprising an interactive content;
    extracting at the user computer by the browser process, the webpage source identifier and the geographic descriptor; transmitting from the user computer to the second server, the webpage source identifier and the geographic descriptor;
    receiving at the user computer a selection input;
    transmitting the selection input to the second server;
    receiving from the second server a first content object corresponding to the selection input;
    automatically selecting, at the second server, a second at least one content data object stored at the second server by matching the transmitted geographic descriptor with an at least one second geographic descriptor corresponding to the second at least one content data object stored at the second server;
    transmitting to the user computer from the second server, the second at least one content data object; and
    displaying on the user computer, by the browser process, the transmitted second at least one content data object within the displayed webpage without redisplaying the entire webpage.

2. The method of claim 1 where the automatically selecting step is further comprised of selecting the second at least one content data object by matching the webpage source identifier with an at least one website source identifier corresponding to the selected at least one content data object.

3. The method of claim 1 where the automatically selecting step is further comprised of:
    determining if the second at least one content data object is comprised of a content type that corresponds to a content type identifier comprising a data record stored on the second server that corresponds to the webpage identifier.

4. The method of claim 3 where the determining step is comprised of executing a text string matching process.

5. The method of claim 1 where the script is interpreted by the browser process.

6. The method of claim 1 where the displaying step is further comprised of displaying the transmitted second at least one content data object in a predetermined location within the displayed webpage as a single session.

7. The method of claim 1 further comprising:
    at the user computer, by the browser process, detecting an at least one interactivity event;
    determining a timing of the detected at least one interactivity event; and
    transmitting a message to the second server comprised of data representing the detected at least one interactivity event type and the determined timing data.

8. The method of claim 1 further comprising receiving as input at the user computer interactivity commands and processing the received interactivity commands using the browser process executing the script.

9. The method of claim 1 where the interactive content is comprised of an interactive element that when rendered by the browser process presents a list of at least one additional interactive content associated with the geographic descriptor.

10. The method of claim 1 further comprising:
    storing at the second server an at least one data representing a content in a data structure that relates the at least one data representing a content to a corresponding at least one geographic descriptor;
    at the second server, using the extracted geographic descriptor to automatically select at least one data representing a content with a matching corresponding geographic descriptor; and
    transmitting from the second server to the user computer the interactive content, said interactive content comprised of the selected at least one data representing a content.

11. The method of claim 1 further comprising:
    at the second server, conducting a logic check to determine the validity of the webpage source identifier.

12. The method of claim 1 where the selecting step is further comprised of: validating the selected second at least one content data object by determining a current date and determining if the second at least one content data object corresponds to a date range that includes the determined current date.

13. The method of claim 1 further comprising:
    at the second server, storing an at least one advertising content data in a data structure that associates the stored at least one advertising content data with an at least one geographic descriptor; and
    at the second server, using the extracted geographic descriptor to select an at least one of the stored advertising content data and transmitting the selected at least one selected advertising content data to the user computer.

14. The method of claim 1 further comprising:
    embedding in the webpage data object a data representing a display layout configuration;
    at the user computer, using the transmitted webpage data object to determine an at least one parametric data about the display layout configuration;
    transmitting to the second server the determined parametric data; and
    at the second server, generating the second content data object by using the transmitted parametric data to automatically select content components or interactivity controls that will comprise the generated second content data object.

15. A computer system for delivering geographically selected content data objects comprised of a processor and a data storage device comprised of program data that when such program data is executed by the computer system processor, causes the computer system processor to perform any one of the methods 1-4, 6-8, and 11-17.

* * * * *